(12) United States Patent
Shah et al.

(10) Patent No.: US 8,611,519 B2
(45) Date of Patent: Dec. 17, 2013

(54) ENABLING PRIORITY BASED CALL HANDLING FOR MULTIPLE DIFFERENT TELEPHONY DEVICES

(75) Inventors: Jyotindra N. Shah, Austin, TX (US); Anup D. Karnalkar, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1349 days.

(21) Appl. No.: 11/829,720

(22) Filed: Jul. 27, 2007

(65) Prior Publication Data

US 2009/0028312 A1    Jan. 29, 2009

(51) Int. Cl.
*H04M 3/42*    (2006.01)

(52) U.S. Cl.
USPC ............ 379/201.02; 379/211.01; 379/208.01; 455/414.1; 455/417

(58) Field of Classification Search
USPC ............ 379/201.01, 201.02, 208.01, 211.01, 379/211.02, 211.03, 212.01; 455/417, 455/414.1
See application file for complete search history.

(56) References Cited

U.S. PATENT DOCUMENTS

| | | | |
|---|---|---|---|
| 5,559,860 A | 9/1996 | Mizikovsky | |
| 5,625,680 A | 4/1997 | Foladare et al. | |
| 5,644,629 A | 7/1997 | Chow | |
| 6,044,146 A * | 3/2000 | Gisby et al. | 379/266.02 |
| 6,373,817 B1 * | 4/2002 | Kung et al. | 370/217 |
| 6,415,026 B1 | 7/2002 | Flood | |
| 6,519,335 B1 | 2/2003 | Bushnell | |
| 6,665,534 B1 | 12/2003 | Conklin et al. | |
| 6,937,880 B2 | 8/2005 | Teranishi | |
| 6,978,003 B1 * | 12/2005 | Sylvain | 379/211.02 |
| 7,983,661 B2 * | 7/2011 | Purontaus et al. | 455/417 |

* cited by examiner

*Primary Examiner* — Antim Shah
(74) *Attorney, Agent, or Firm* — Jackson Walker L.L.P.

(57) ABSTRACT

A disclosed application server and method are operable to enable a user to access and modify a remote user profile stored on or otherwise accessible to the application server. The user profile identifies the user's CPE devices and information indicative of priority based call handling rules defined by the user. The profile may also include priority levels assigned by the user to selected telephone numbers. The application server downloads a user's profile information to the CPE devices identified in the profile, which may include multiple CPE devices that operate on different telecommunications networks, for example, VoIP networks, wireless cellular networks, and/or traditional TDM networks. The application server communicates the profile information to the CPE devices defined in the profile. In the case of a TDM phone, the application server uses an intermediary, such as a central office or Service Node, to implement the service on behalf of a TDM telephone.

12 Claims, 4 Drawing Sheets

ENABLING PRIORITY BASED CALL HANDLING FOR MULTIPLE DIFFERENT TELEPHONY DEVICES

FIELD OF THE DISCLOSURE

The present disclosure relates generally to the field of telephony and, more specifically, networked telephony services.

BACKGROUND OF THE DISCLOSURE

Telephony services provide enhanced functionality to telephone service subscribers. Call waiting, for example, enables subscribers at least some ability to manage multiple incoming calls. Whereas telephony services were implemented on one or a very limited number of network types historically, the advent of digital telephony and mobile telephony has resulted in the provision of basic telephony capability through a variety of networks. While the emergence of different types of telephone networks has been beneficial to subscribers generally, it has resulted in increased complexity for subscribers and consumers in the context of value added telephony services and features. As an example, a subscriber or other user who uses two or more types of telephony networks may have to duplicate efforts when implementing and maintaining various services and features such as address books, call waiting, Caller ID, and so forth.

DETAILED DESCRIPTION OF THE DRAWINGS

In one aspect, a disclosed application server is operable to enable a user to access and modify a user profile stored on or otherwise accessible to the application server. The user profile may include information indicative of a set of CPE devices of the user as well as information indicative of priority based call handling rules defined by the user. The applicable priority based call handling rules may be determined by other parameters including, for example, date/time information including the day of the week, the time of day, day of month, and the like, geographic information including the geographic location of the user, recency information including information indicative of the CPE device most recently used, and so forth. The profile may also include information indicative of priority levels assigned by the user to selected telephone numbers.

The application server is further operable to download or otherwise communicate a user's profile information to the CPE devices identified in the profile. The set of CPE devices identified in a profile may include two or more CPE devices that operate on different telecommunications networks. The CPE devices may, for example, include CPE devices that operate on VoIP networks including IPTV, wireless cellular networks, and/or traditional TDM networks. The application server is operable to communicate the profile information or otherwise implement the priority based, user defined rules on each of the CPE devices defined in the profile. In the case of a TDM phone, the application server may download the profile information including the priority rules to an intermediary, such as a central office or a service node, that implements a priority based call handing system on behalf of a TDM telephone.

In another aspect, disclosed CPE devices are operable to communicate with the application server and receive the profile information. The CPE devices are further operable to detect an incoming call when a current call is in progress. The CPE devices may handle the incoming call by determining priority levels associated with each call, comparing the determined priority levels and handling the incoming call based on the result of the comparison. When, for example, the incoming call has a higher priority than the call in progress, the CPE device may handle the incoming call based on the downloaded priority handling rules defined by the user to enable the user to answer the incoming call and place the call in progress on hold. If, on the other hand, the priority level of the incoming call is lower than the priority level of the call in progress, the incoming call may be routed automatically to voice mail or elsewhere with or without notification to the user.

In another aspect, disclosed is a method of providing a priority based call handling service to a user. The service includes provisioning or otherwise enabling a storage resource with a user profile data structure and configuring an application server to have access to the profile data structure. The profile data structure may include priority based call handling rules, priority assignments for one or more telephone numbers, and entries indicating a set of CPE devices whose priority handling rules are determined by the profile. The disclosed service includes enabling a user to access and modify the profile data structure through the use of a web server to which a user computer system has access via the Internet or another IP based network. The service includes configuring the application server to download the profile information to CPE devices defined in profile either periodically or from time to time based, perhaps, on an asynchronous event including, as an example, the modification of the user's profile. Embodiments of the disclosed subject matter may also be implemented as computer programs embedded in a computer-readable medium.

Disclosed herein is a technique and system enabling a telecommunications subscriber or user to access an external platform to create a rules-based service assigning priority levels to selected terminating telephone numbers. The assigned priority levels are used by the user's individual communications equipment or CPE (mobile, landline etc.) to route incoming calls when existing calls are in progress. The rules are downloaded to any one or more of the CPE devices defined in the profile. The service encompasses environments and applications in which the user's CPE includes diverse CPE devices, e.g., CPE devices that operate on a VoIP network including IPTV, devices that operate on a cellular network, devices that operate on a TDM network and so forth. These rules might be invoked for each incoming call to route the call appropriately. In some implementations, the user CPE may include a client that "pulls" the profile from the application server from time to time while, in other environments, the application server may push the profile information out to the CPE devices. The disclosed subject matter allows a user's CPE to control incoming call routing when an existing call is in progress. The CPE will apply the user defined rules to the incoming call based on (1) the telephone number obtained, e.g., from CallerID or a lack thereof, e.g. PRIVATE or UNKNOWN, and (2) the priority assigned to the incoming caller relative to the priority assigned to the caller on the call in progress.

Figure 1:
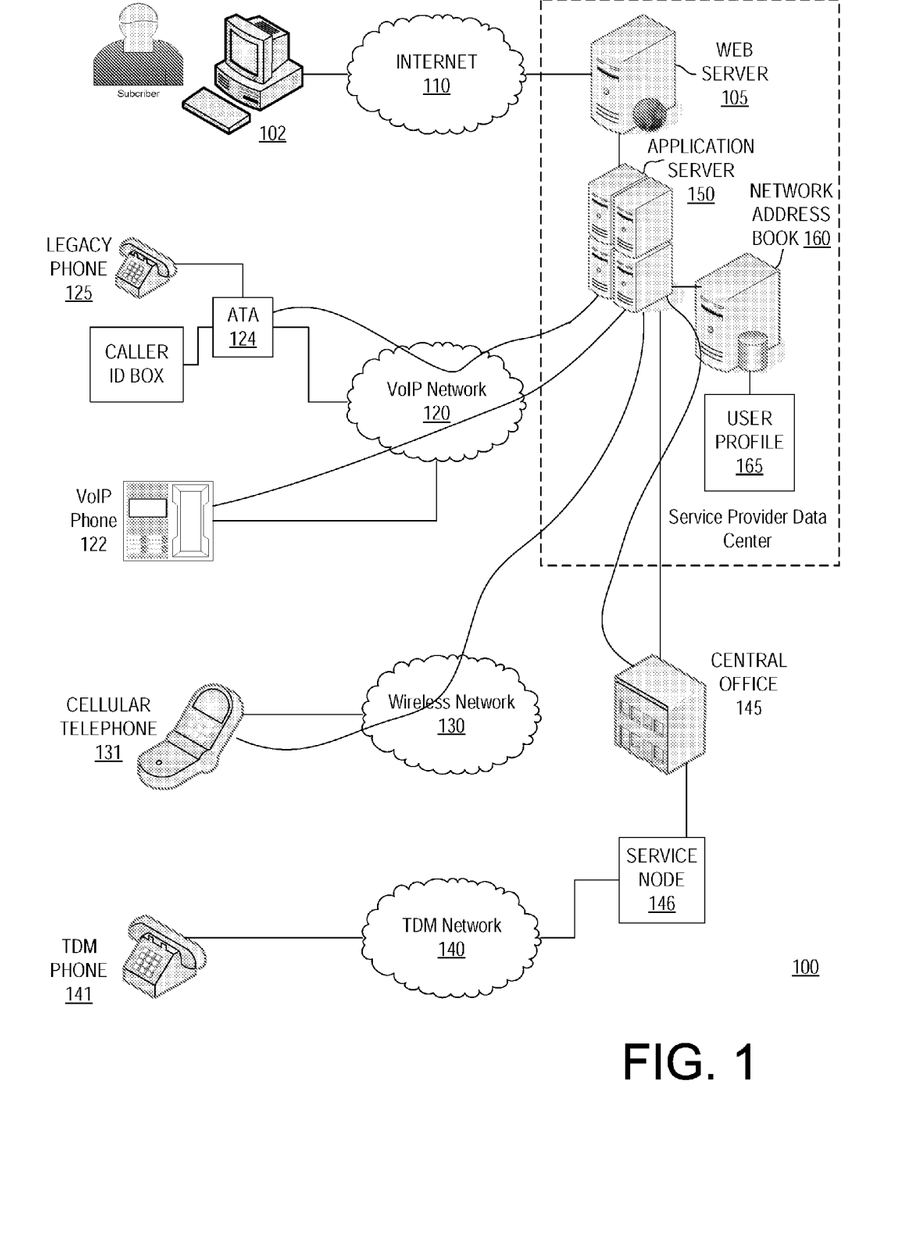
FIG. 1 is a block diagram illustrating selected elements of a telephone environment emphasizing the use of a centralized user profile applicable to various types of telephone devices and telephone networks.

Referring to FIG. 1, selected elements of a telephony environment 100 are shown to emphasize the use of a centralized server to provide a value added feature to a user across multiple types of telephone networks and telephone devices. In the example described below, the value added service concerns priority handling of incoming calls, but the architecture of the environment shown is applicable to other applications, including, as an example, call forwarding.

Environment 100 as illustrated includes an application server 150 configured for communication with a web portal server 105 and having access to a user profile 165. A user of telephone services may use a conventional desktop computer 102 to access web portal server 105 via the Internet 110 or another public or private network. In some embodiments, web portal server 105 is provisioned to authenticate a user of computer 102 to access a user's profile 165 using a web browser or other suitable interface installed on computer 102. Although computer 102 is referred to explicitly as a desktop or laptop computer, other network aware devices including PDA's, pocket computers, and data capable cellular telephones may be used to access web portal server 105.

Web portal server 105 may provide an authorized user with an introductory or home page that is customizable to the user. The user's home page may include a link or other element to access a user profile 165. In some implementations, the user profile 165 is a value added service or feature that is provided to a user as a fee-based option. In other implementations, the user profile 165 or portions thereof may be freely accessible to the user.

As shown FIG. 1, user profile 165 is accessible to application server 150 through an intermediary server or storage device identified in FIG. 1 as network address book 160. Network address book (NAB) 160 in some embodiments, is a database server that provides a network based repository for all or some of a user's personalized communication information. This information, as described in greater detail below, may include names, phone numbers, email addresses, IM addresses, and/or street addresses for the client's personal contacts. In addition, the NAB 160 may include a description of the telephone and/or other devices owned or assigned to the user and user specific preferences for various services and features. Although the depicted embodiment illustrates the user profile 165 as being provided in conjunction with a network address book 160, other implementations are feasible. For example, the user profile 165 may comprise a portion of a database located on or accessible to application server 150.

FIG. 1 conceptually illustrates the communication between application server 150 and a variety of diverse types of telephone devices. For example, FIG. 1 illustrates a VoIP phone 122 operable to communicate with application server 150 via a VoIP network 120. VoIP network 120 represents an IP-based network incorporating a VoIP protocol including, as examples, the International Telecommunications Union's (ITU's) H.323 protocol and the Internet Engineering Task Force's (IETF's) Session Initiation Protocol (SIP), both of which will be familiar to one of ordinary skill in the field of telecommunications. Similarly, FIG. 1 illustrates a legacy an analog telephone 125 connected to an analog telephone adapter (ATA) 124 that enables telephone 125 to communicate with application server 150 via VoIP network 120.

FIG. 1 also shows a cellular telephone 131 operable to communicate with application server 150 via a wireless network 130. Wireless network 130 is representative of various second generation (2G) and third generation (3G) wireless network implementations including, as examples, Global System for Mobile communications (GSM) networks, Personal Communication System (PCS) networks, GPRS/EDGE networks, Advanced Mobile Phone System (AMPS) networks, Digital AMPS or D-AMP systems, also known as TDMA networks, CDMA2000 networks, and the like.

FIG. 1 also illustrates a conventional time division multiplexing (TDM) phone 141 in communication with application server 150 through an intermediary. The intermediary might represent, for example, a user's central office (CO) 145 and/or a Service Node 146. In this embodiment, a provider might offer a user a service, generally designed for a network-aware device, for use in connection with a conventional TDM phone. The CO 145, Service Node 146, or another suitable intermediary would have access to the user's profile 165 and could implement all or some of the service at CO 145. In the case of a call prioritization service, for example, the prioritizing and applicable handling of calls to a user's TDM phone 141 might be performed by CO 145, Service Node 146, or other intermediary.

Figure 2:
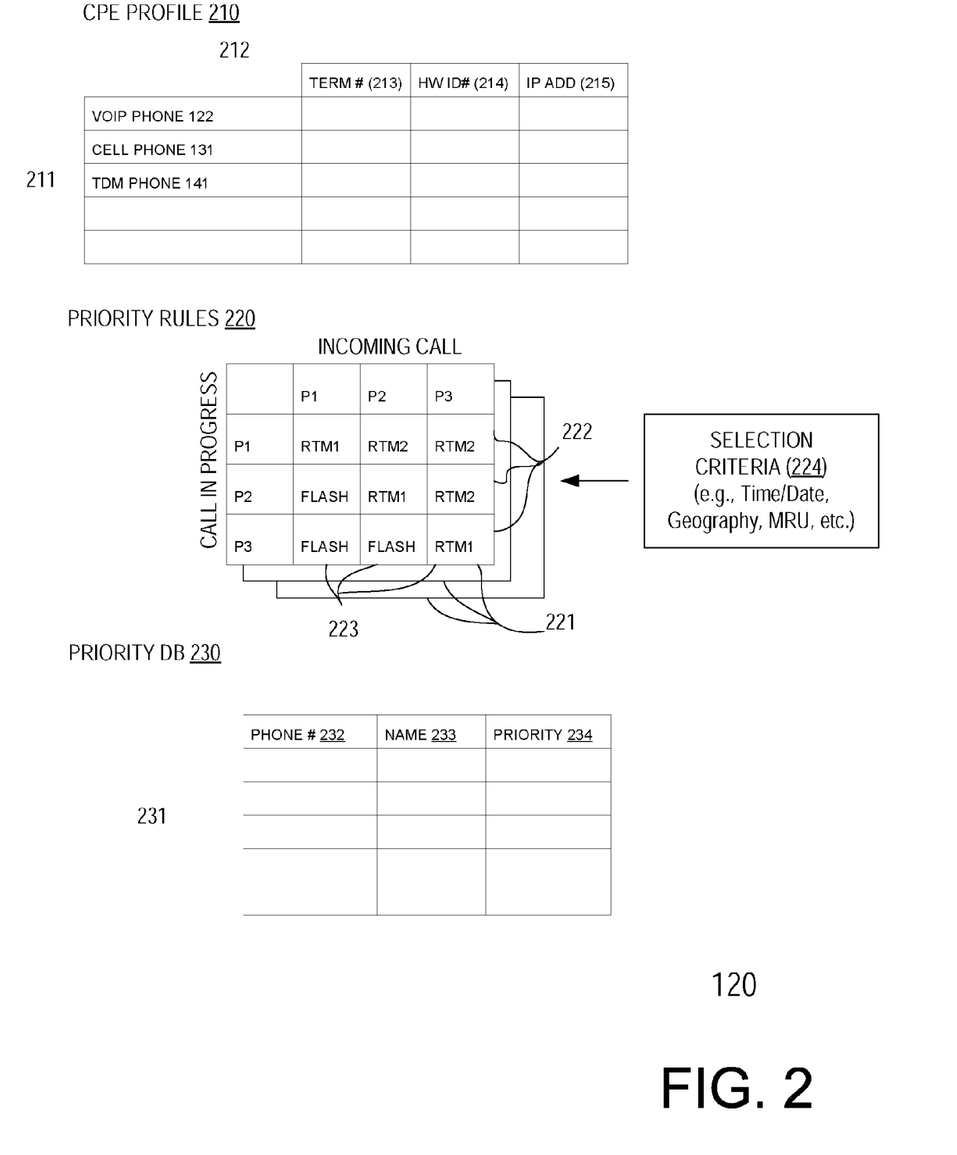
FIG. 2 is an exemplary and conceptual depiction of a user profile.

Referring now to FIG. 2, an exemplary portion of a data structure referred to herein as user profile 165 is depicted. In the depicted embodiment, three components of user profile 165 are illustrated explicitly. In the depicted embodiment, user profile 165 includes a CPE profile component 210, a priority rules component 220, and a priority database component 230. CPE profile component 210 as shown is a user defined identification of the user's telephone equipment applicable to the particular user profile 165. In some embodiments, a user may define multiple profiles, perhaps paying a flat or periodic fee for each profile. A profile applies to the equipment identified within the CPE component 210 of the profile. As seen in FIG. 2, the CPE component 210 may include multiple entries 211. Each entry 211 may include multiple fields of information including, as an example, a textual description field 212, a termination phone number field 213, a hardware identification field 214, and an IP or other type of network address field 215. Other implementations may include additional or fewer fields in each entry. A user may wish to have a single profile that is applied to all of the user's CPE, individual profiles for each piece of CPE, or something intermediate between these two extremes.

Priority rules component 220 as shown contains information indicative of user defined rules for implementing a service offered by the provider. In FIG. 2, for example, a set of priority rules matrices 221 is illustrated to reflect a possible implementation of user defined rules for implementing a priority-based call handling service. In the illustrated embodiment, the service enables a user to define rules as to how an incoming call is to be handled based on user specifiable priorities that can be applied to callers based upon identifying information such as CallerID information or, for anonymous callers and/or callers that block CallerID information, the lack of CallerID information. For example, priority rules component 220 as shown is represented conceptually by one or more priority rules matrices 221. A priority rules matrix 221 as shown includes N rows 222 and N columns 223 wherein N is an integer greater than 0 and typically greater than 1. Each row 222 represents the priority assigned to the party on a call in progress with the user while each column 223 represents the priority assigned to the party making the incoming call. A priority-based call handling service might enable a user to customize the handling of incoming calls when the user is on another line.

The exemplary priority rules matrix 221 as shown in FIG. 2, for example, defines three priority levels for both the call in progress and the incoming call. In this embodiment, a total of nine possible combinations of incoming call priority and call in progress priority are defined. Priority rules matrix 221 as shown in FIG. 2 defines a total of three rules to handle the nine possible combinations of priorities. When an incoming call is associated with a caller who has been assigned a priority that is equal to the priority assigned to a call in progress, priority rules matrix 221 indicates that the call should be handled with an "RTM1" procedure. The RTM1 procedure might represent a $1^{st}$ route-to-message rule in which the incoming call is automatically routed to voice mail or another call messaging service with a visual indication to the user, perhaps through the use of a display screen of the CPE or a display box associated with the CPE. A second rule "RTM2" is invoked for each of the three combinations in which the incoming call is associated with a caller that has a lower assigned priority than the existing call. The RTM2 message type might, for example, route the incoming call directly to voice mail without providing any indication, visual or otherwise, to the user. Other embodiments, of course, may employ different variations on the prioritization rules described herein. Thus, for example, the RTM2 rule might forward the incoming call to a messaging service while providing an audio, but not visible indication or confirmation.

Priority rules matrix 221 further illustrates a "FLASH" rule defined for situations in which the incoming call is associated with a caller that has a higher priority than the other party to a call in progress. In this situation, the FLASH rule might, for example, cause a visual and/or audible indication of the incoming call, perhaps also indicating the identity or calling number of the incoming call, while offering the user the opportunity to switch-hold the call in progress to handle the higher priority incoming call.

Priority rules component 220 as shown provides for flexibility in applying priority rules by enabling or supporting the presence of multiple priority rule matrices 221. In this embodiment, a selection criteria data structure 224 may contain user defined information indicative of the particular priority rules matrix 221 to be used. The selection criteria data structure 224 may contain, as examples, information indicating the applicable priority rules matrix 221 based on criteria such as time/date criteria, geographic criteria, and recency criteria. Time/date criteria may include criteria determining the appropriate priority rules matrix 221 based on the time of day, day of week, day of month or a combination thereof. Thus, for example, a user may define selection criteria data structure 224 to apply a first priority rules matrix 221 during weekends and holidays, a second priority rules matrix 221 during weekday working hours, a third priority rules matrix 221 during weekdays after hours, and so forth. Geographic criteria may be used to influence the priority matrix selection based on the user's geographic location. Thus, for example, the geographic criteria may define a preference for a first priority rules matrix when the user is "in town" based, e.g., on a suspected location of the user's cellular telephone, and a second priority rules matrix when the user is "out of town." A recency criteria might indicate a preference based on the CPE device that was most recently used (MRU). Thus, selection criteria data structure 224 may define a preference for an indicated priority rules matrix when the user has most recently used his/her cellular telephone on the theory that the user is most likely to take or make the next call on the same CPE device. Other selection criteria may be incorporated within selection criteria data structure 224 and the selection criteria may be combined and/or prioritized hierarchically or otherwise.

CPE profile component 210 as shown in FIG. 2 also includes a priority database component 230. In the depicted implementation priority database component 230 includes a listing of at least some of the personal contact information associated with the user. As shown in FIG. 2, the listing includes a plurality of entries 231 each of which may include a phone number field 232, a name field 233, and a priority field 234. The user may define the priority associated with each of a plurality of personal contacts and may assign a priority to unknown callers as well. For example, one implementation may assign a priority level PI (lowest priority) to any call that does not originate with a known user. In some embodiments, all or some of priority database component 230 is downloaded from an external source such as a network address book stored on network address book 160.

In some implementations, the user profile 165 is located on or accessible to application server 150 and is downloaded from time to time from application server 150 to the CPE devices defined in the profile. After a profile is downloaded, each network-aware CPE device including, for example, VoIP phone 122, ATA-connected phone 125 (via ATA 124), and/or cell phone 131 contains a local copy of the profile including the profile information pertaining to the priority handling service. When an incoming call competes with a call in progress in any of these CPE devices, the local copy of the assigned priorities and the priority handling rules enables the CPE device to handle the incoming call according to a customized rule base that is defined by the user. When a high priority call is incoming and the user is in progress on a low priority call, the priority-based call handing rules 220 dictate that the CPE inform the user of the incoming call and offer the user the opportunity take the incoming call. On the other hand, a low priority incoming call is routed directly to a messaging destination without informing the user or perhaps informing the user in an unobtrusive manner, e.g. flashing an LED on the CPE. Other rules may be defined by the user to handle other scenarios appropriately.

In some embodiments, the priority based call handling functionality described herein is implemented, at least in part, as a computer program product, also sometimes referred to as computer software. A computer program product is a set of computer executable instructions stored on a computer readable medium, e.g., a removable medium such as a CD or DVD, persistent storage such as a hard disk, flash memory, ROM, or the like, or a volatile medium, e.g., a system memory or other DRAM (dynamic random access memory) resource and/or a cache memory or other SRAM (static random access memory) resource of a computer system. Computer program product embodiments are sometimes illustrated as a flow diagram representing a method that is performed or executed when a suitable computer or other data processing system executes the computer readable instructions stored on the computer readable medium.

Figure 3:
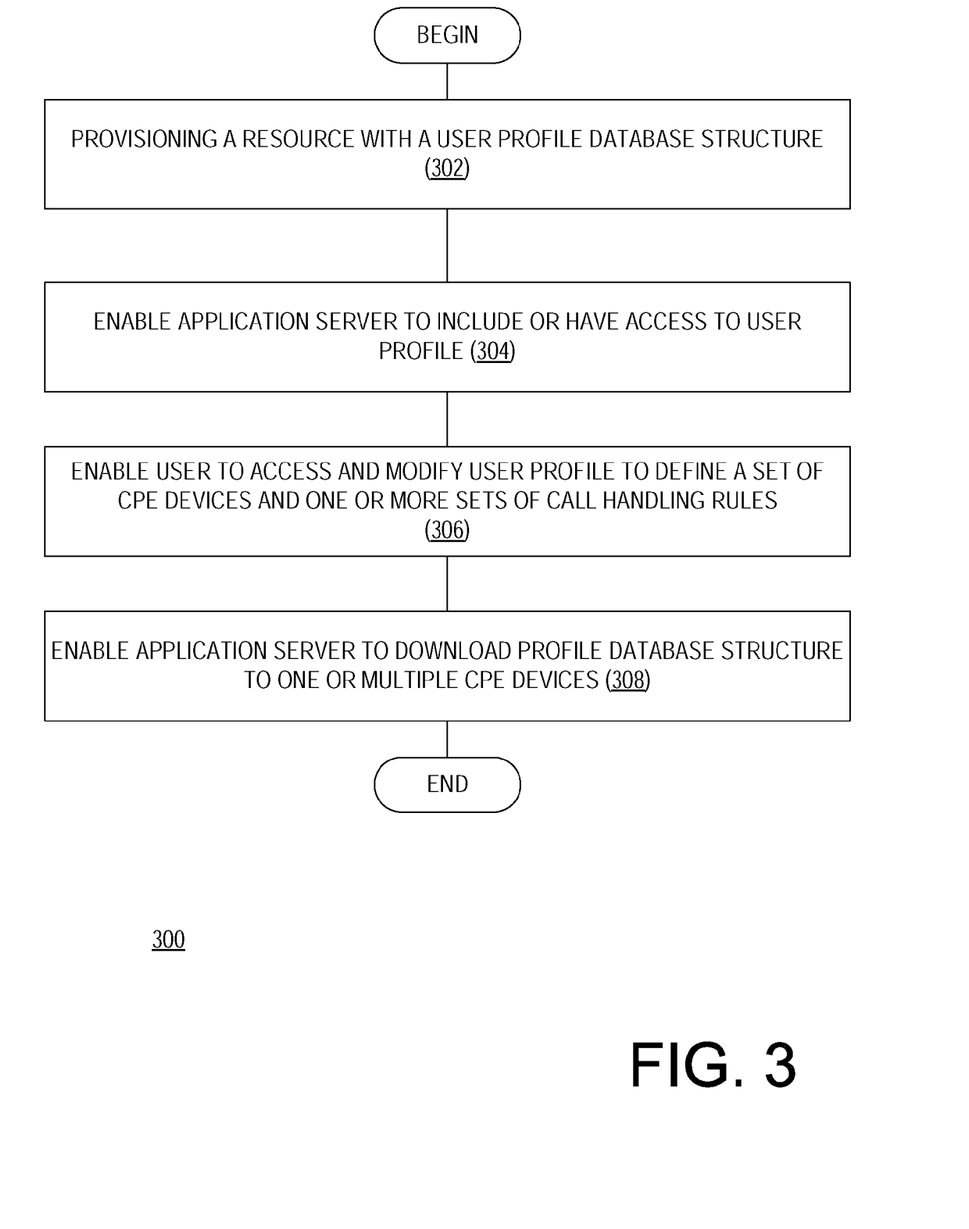
FIG. 3 is a flow diagram illustrating an embodiment of a method of enabling or providing a priority based call handling system suitable for use with a diverse set of telephony equipment.

Referring now to FIG. 3, selected elements of one embodiment of a method 300 of providing a priority based call handling service to a user is depicted. In the depicted embodiment, method 300 includes providing, provisioning, or configuring (block 302) a user profile data base structure and enabling (block 304) an application server to include or have access to a user profile. The user profile data structure contains or may be modified by a user to contain CPE information indicative of the user's CPE devices and rules information indicative of user defined rules for handling competing calls based on priorities of the calls. In addition, the user profile may include or be modified to include a priority database indicative of priority levels associated with one or more of the user's personal contacts. The profile may also define a default priority level for calls that are from unrecognized callers. The user profile data structure may be provided on the application server, on a network address book 160 to which the profile has access, or on another storage device (not depicted) to which application server 150 has access.

Method 300 as shown further includes enabling (block 306) a user to access and/or modify the profile data structure from a remote computer or other data processing system. In some embodiments, including the embodiment illustrated in FIG. 1, enabling the user to access the user's profile includes provisioning a web server 105 accessible to the user via a conventional web browser or other suitable web-based client. The web server 105 is in communication with application server 150. Either web server 105 and/or application server 150 may be provisioned to include an authorization module restricting access to user profile 165. In some embodiments, enabling the user to access and modify the profile data structure includes enabling the user to access and modify the data structure to define call handling rules, e.g., the priority rules 220 discussed above, define a set of the user's CPE devices, e.g., the CPE profile component 210 described above, and define priority for selected callers based on some type of caller identification including, but not limited to CallerID information. The user may also be enabled to define multiple sets of priority based rules and to define selection criteria for selecting an "active" priority rule set.

The depicted embodiment of method 300 further includes enabling (block 308) the application server 150 to download at least a portion of user profile information to a user's CPE device or devices. The devices to which the user profile is downloaded may be defined in the profile itself and may include all or a subset of the user's CPE devices. The CPE devices may include, as examples, VoIP telephones, cell phones, and conventional phones in combination with ATA devices or a central office.

Figure 4:
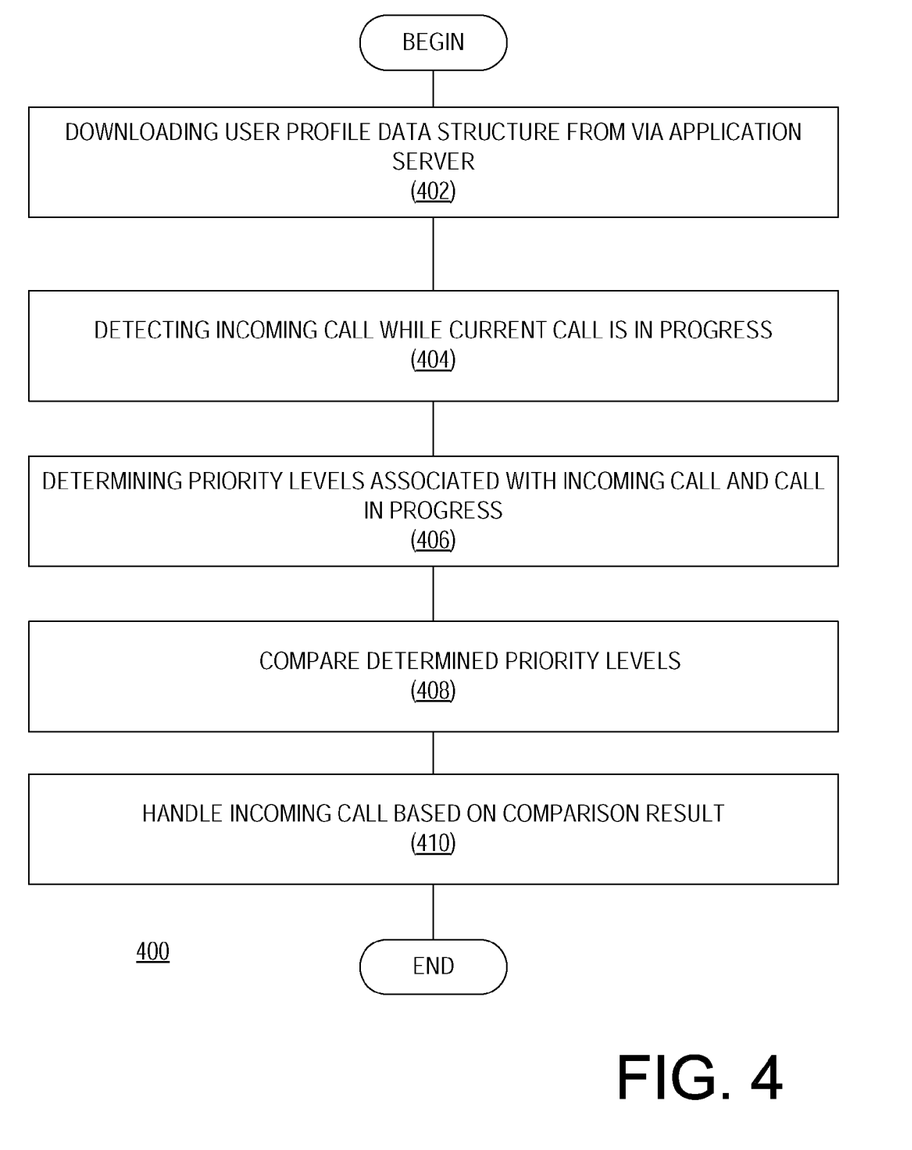
FIG. 4 is a flow diagram illustrating an embodiment of a method of handling competing calls in a customer premise equipment device.

Referring now to FIG. 4, a flow diagram illustrates selected elements of one embodiment of a method 400 of handling competing calls by a CPE device. In the depicted embodiment, method 400 includes downloading (block 402) at least a portion of a user profile data structure to at least one CPE device and, in at least some cases, to two or more CPE devices substantially simultaneously or in close chronological proximity to one another. The downloading may be initiated by the user, either through an interface such as a keypad of the CPE device or via a web browser on a conventional computer or other data processing device communicating with web portal server 105 in communication with application server 150. In other embodiments, downloading may be initiated by the CPE device, for example, by polling application server 150 from time to time. In still other embodiments, downloading the profile data structure may be initiated by application server 150 periodically or in response to an asynchronous event including, e.g., the application server detecting a modification of an existing profile data structure.

The portion of the data structure downloaded may include information indicative of user selected priority levels associated with two or more of the users contacts as well as information indicative of priority-based rules indicative of a user's preference(s) for handling competing calls based on the respective priority levels associated with each call.

Method 400 as shown further includes a CPE device detecting (block 404) an incoming call while a current call is still in progress. In response to detecting the incoming call competing with the call in progress, method 400 as shown includes the CPE device determining (block 406) priority levels associated with the incoming call and the call in progress. Determining a priority level may include using caller ID information associated with a call to index a portion of the profile data structure.

Method 400 as shown further includes comparing (block 408) the priority levels of the competing calls and handling (block 410) the incoming call based on the comparison of the respective priority levels associated with each call. In some embodiments, handling the incoming call may include routing the incoming call to a voice mail or other messaging application, with or without notification to the user, when the priority level of the incoming call does not exceed the priority level of the call in progress. The routing may further include holding the call, informing the user about the call, and giving the user opportunity to answer the call when the priority level of the incoming call is greater than the priority level of the call in progress. Other techniques for handling calls may be defined by the user.

The call handling service described herein may be provided as a service for which a fee is charged. In some embodiments, the fee for the call handling service may vary depending upon the extent to which the service is utilized. For example, a provider may offer a base level of the call handling service for a nominal cost or free of charge. The base level service may permit, for example, only a single set of priority rules, priority assignments for a limited number of phone numbers, and/or limit the number of CPE devices for which the call handling service applies. The provider may offer increased levels of the service on a fixed or sliding scale basis.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium may be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein. In addition, the described methods may be implemented in firmware or other suitable combination of hardware and software.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, XML, and AJAX) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing a call handling service to a user, the method comprising:
   accessing a call handling profile, the calling handling profile indicative of:
      priority level associations between calling party phone numbers and a set of priority levels; and
      call handling rules including a plurality of priority rules matrices, wherein each priority rule matrix:
         is associated with a corresponding customer premise device; and
         indicates call handling priority for the corresponding customer premise device based on priority levels associated with calling party phone numbers; and
   responsive to receiving, while an initial call from a first calling party phone number associated with a first priority level is in progress, a subsequent call from a second calling party phone number:
      identifying, from the priority level associations in the call handling profile and the second calling party phone number, a second priority level, wherein the second priority level is a priority level associated with the second calling party phone number;
      selecting a priority rules matrix associated with a most recently used customer premises device;
      identifying, from the priority rules matrix associated with the most recently used customer premises device, a selected call handling rule based on the first priority level and the second priority level; and
      processing the subsequent call according to the selected call handing rule, wherein the selected call handling rule routes the subsequent call to a voice mail application without notifying a recipient of the subsequent call.

2. The method of claim 1, further comprising:
   receiving the call handling profile from an application server via a communication network.

3. The method of claim 1, wherein the customer premises device is selected from the group consisting of a voice over IP telephone, a time division multiplexing telephone, and a cellular telephone.

4. The method of claim 1, further comprising:
   downloading the call handling profile to a central office in communication with a time division multiplexing telephone, wherein the central office performs the priority-based call handling on behalf of the time division multiplexing telephone.

5. The method of claim 1, wherein the selected call handling rule routes the subsequent call to a messaging system.

6. The method of claim 1, wherein the selected call handling rule informs a recipient of the subsequent call of the second calling party phone number and permits the recipient to take the subsequent call.

7. A non-transitory computer readable medium including processor executable instructions which, when executed by a processor, cause the processor to perform operations comprising:
   accessing a call handling profile, the calling handling profile indicative of:
      priority level associations between calling party phone numbers and a set of priority levels; and
      call handling rules including a plurality of priority rules matrices, wherein each priority rule matrix:
         is associated with a corresponding customer premise device; and
         indicates call handling priority for the corresponding customer premise device based on priority levels associated with calling party phone numbers; and
   responsive to receiving, while an initial call from a first calling party phone number associated with a first priority level is in progress, a subsequent call from a second calling party phone number:
      identifying, from the priority level associations in the call handling profile and the second calling party phone number, a second priority level, wherein the second priority level is a priority level associated with the second calling party phone number;
      selecting a priority rules matrix associated with a most recently used customer premises device;
      identifying, from the priority rules matrix associated with the most recently used customer premises device, a selected call handling rule based on the first priority level and the second priority level; and
   processing the subsequent call according to the selected call handing rule, wherein the selected call handling rule routes the subsequent call to a voice mail application without notifying a recipient of the subsequent call.

8. The non-transitory computer readable medium of claim 7, wherein the operations include:
   receiving the call handling profile from an application server via a communication network.

9. The non-transitory computer readable medium of claim 7, wherein the customer premises device is selected from the group consisting of a voice over IP telephone, a time division multiplexing telephone, and a cellular telephone.

10. The non-transitory computer readable medium of claim 7, wherein the operations include:
    downloading the call handling profile to a central office in communication with a time division multiplexing telephone, wherein the central office performs the priority-based call handling on behalf of the time division multiplexing telephone.

11. The non-transitory computer readable medium of claim 7, wherein the selected call handling rule routes the subsequent call to a messaging system.

12. The non-transitory computer readable medium of claim 7, wherein the selected call handling rule informs a recipient of the subsequent call of the second calling party phone number and permits the recipient to take the subsequent call.

\* \* \* \* \*